(12) United States Patent
Ritter et al.

(10) Patent No.: US 8,872,978 B2
(45) Date of Patent: Oct. 28, 2014

(54) CABLE EQUALIZATION AND MONITORING FOR DEGRADATION AND POTENTIAL TAMPERING

(75) Inventors: David W. Ritter, San Jose, CA (US); Kathryn M. Tucker, San Jose, CA (US)

(73) Assignee: Intersil Americas LLC, Milpitas, CA (US)

( * ) Notice: Subject to any disclaimer, the term of this patent is extended or adjusted under 35 U.S.C. 154(b) by 425 days.

(21) Appl. No.: 13/228,823

(22) Filed: Sep. 9, 2011

(65) Prior Publication Data

US 2012/0314130 A1 Dec. 13, 2012

Related U.S. Application Data

(60) Provisional application No. 61/495,159, filed on Jun. 9, 2011.

(51) Int. Cl.

| | |
|---|---|
| *H04N 5/21* | (2006.01) |
| *H04N 21/61* | (2011.01) |
| *H04N 5/208* | (2006.01) |
| *H04N 21/442* | (2011.01) |
| *H04N 21/488* | (2011.01) |

(52) U.S. Cl.
CPC ..... *H04N 21/44209* (2013.01); *H04N 21/6118* (2013.01); *H04N 5/208* (2013.01); *H04N 21/4882* (2013.01)
USPC ........... 348/627; 348/607; 348/608; 348/622; 348/180; 348/192; 375/233; 375/224; 725/107

(58) Field of Classification Search
CPC .......... H04N 5/21; H04N 5/208; H04N 7/102
USPC ......... 348/607, 706, 608, 622, 627, 180, 192; 382/275, 274; 375/232, 233, 224; 333/18, 28 R; 725/107
See application file for complete search history.

(56) References Cited

U.S. PATENT DOCUMENTS

| | | |
|---|---|---|
| 3,806,658 A | 4/1974 | Anderson et al. |
| 4,151,490 A | 4/1979 | Bazin |

(Continued)

FOREIGN PATENT DOCUMENTS

| | | |
|---|---|---|
| EP | 0611059 | 8/1994 |
| GB | 466 092 | 5/1937 |

(Continued)

OTHER PUBLICATIONS

Stewart, J., "Calculus" Third Edition, Copyright 1995 by Brooks/Cole Publishing Company, ISBN 0 534-021798-2, pp. 100-109.

(Continued)

*Primary Examiner* — Jefferey Harold
*Assistant Examiner* — Jean W Desir
(74) *Attorney, Agent, or Firm* — Vierra Magen Marcus LLP

(57) ABSTRACT

Provided herein are methods and systems that provide automatic compensation for frequency attenuation of a video signal transmitted over a cable. In accordance with an embodiment, a system includes an equalizer and a compensation controller. The equalizer receives a video signal that was transmitted over a cable, provides compensation for frequency attenuation that occurred during the transmission over the cable, and outputs a compensated video signal. The compensation controller automatically adjusts the compensation provided by the equalizer based on comparisons of one or more portions of the compensated video signal to one or more reference voltage levels. One or more values indicative of one or more levels of compensation provided by the equalizer are stored in memory and/or registers for each time, of a plurality of times. A monitor monitors for changes in the cable and/or the video signal transmitted over the cable based on the stored values. Additionally, the monitor can selectively trigger an alert based on changes in the one or more stored values.

23 Claims, 9 Drawing Sheets

(56) References Cited

U.S. PATENT DOCUMENTS

| | | | |
|---|---|---|---|
| 4,785,265 | A | 11/1988 | Molnar et al. |
| 4,970,722 | A | 11/1990 | Preschutti |
| 5,559,808 | A | 9/1996 | Kostreski et al. |
| 5,987,065 | A | 11/1999 | Candage |
| 6,571,393 | B1 | 5/2003 | Ko et al. |
| 6,590,930 | B1 | 7/2003 | Greiss |
| 6,882,634 | B2 | 4/2005 | Bagchi et al. |
| 7,003,030 | B2 | 2/2006 | Abdelilah et al. |
| 7,089,577 | B1 | 8/2006 | Rakib et al. |
| 7,146,630 | B2 | 12/2006 | Dravida et al. |
| 7,221,389 | B2 | 5/2007 | Ahern et al. |
| 7,248,841 | B2 | 7/2007 | Agee et al. |
| 7,440,035 | B2 | 10/2008 | Mori |
| 7,563,996 | B2 | 7/2009 | Loeffelholz et al. |
| 7,620,101 | B1 | 11/2009 | Jenkins |
| 7,760,272 | B2 | 7/2010 | Miller |
| 7,787,057 | B2 | 8/2010 | Hall et al. |
| 8,059,208 | B2 | 11/2011 | Grigorian et al. |
| 8,576,966 | B2 | 11/2013 | Firmoff et al. |
| 2002/0027886 | A1 | 3/2002 | Fischer et al. |
| 2002/0057713 | A1 | 5/2002 | Bagchi et al. |
| 2002/0163932 | A1 | 11/2002 | Fischer et al. |
| 2002/0174435 | A1 | 11/2002 | Weinstein et al. |
| 2003/0169374 | A1 | 9/2003 | Cole et al. |
| 2005/0024109 | A1 | 2/2005 | Amin |
| 2005/0134748 | A1 | 6/2005 | Hoerl |
| 2006/0182171 | A1 | 8/2006 | Kuijk et al. |
| 2006/0245517 | A1 | 11/2006 | Ikedo et al. |
| 2007/0052849 | A1 | 3/2007 | Craddock et al. |
| 2007/0105504 | A1 | 5/2007 | Vorenkamp et al. |
| 2007/0164806 | A1 | 7/2007 | Gasper et al. |
| 2007/0296868 | A1 | 12/2007 | Hall |
| 2009/0059782 | A1 | 3/2009 | Cole |
| 2010/0110288 | A1* | 5/2010 | Ritter et al. .................. 348/500 |
| 2011/0277010 | A1 | 11/2011 | Paul |

FOREIGN PATENT DOCUMENTS

| | | |
|---|---|---|
| JP | 05-184065 | 10/1993 |
| JP | 05-284064 | 10/1993 |
| WO | WO 03/071804 | 8/2003 |

OTHER PUBLICATIONS

Office Action dated Mar. 12, 2010, in U.S. Appl. No. 12/412,280.
Office Action dated Apr. 20, 2010, in U.S. Appl. No. 12/412,280.
Office Action dated Sep. 3, 2010, in U.S. Appl. No. 12/412,280.
Office Action dated Apr. 15, 2011, in U.S. Appl. No. 12/412,280.
European Search Report for European Patent No. EP 2182647, dated Apr. 23, 2010.
Partial European Search Report for European Patent Application No. EP 09174643, dated Mar. 3, 2010.
International Search Report for PCT/US2010/022772, dated Jun. 7, 2010.
Intersil; Sync Separator with Horizontal Output; Data Sheet; Jul. 26, 2004; 9 pages; FN7010.1.
Intersil; 100MHz Differential Twisted-Pair Drivers; Data Sheet; Oct. 29, 2004; 13 pages; FN7309.5.
Intersil; Differential Receiver/Equalizer; Data Sheet; Jul. 15, 2005; 8 pages; FN7305.4.
Intersil; 170MHz Triple Video Digitizer with Digital PLL; Data Sheet; Jun. 6, 2005; 29 pages; FN8218.0.
Intersil; CAT-5 Video Transmission: Troubleshooting and Equalization; Application Note; Aug. 2, 2007; 8 pages; AN1307.0.
Intersil; Differential Receiver/Equalizer; Data Sheet; Nov. 30, 2007; 10 pages; FN7305.5.
Intersil; Transmitting SXGA Video Signal Through 1kft (300m) CAT-5 Cable; Application Note; Jan. 2, 2008; AN1318.0.
Pearson, J., "Adjustable Cable Equalizer Combines Wideband Differential Receiver with Analog Switches," Analog Dialogue 38-07, pp. 1-4 (Jul. 2004).
Notice of Allowance dated Apr. 4, 2013, in U.S. Appl. No. 13/760,592 filed Feb. 6, 2013.
Office Action dated Oct. 17, 2012, in U.S. Appl. No. 12/412,280 filed Mar. 26, 2009.
Amendment dated Oct. 22, 2012, in U.S. Appl. No. 12/412,280 filed Mar. 26, 2009.
Notice of Allowance dated Oct. 30, 2012, in U.S. Appl. No. 12/412,280 filed Mar. 26, 2009.
Office Action dated Aug. 20, 2012, in U.S. Appl. No. 12/412,280 filed Mar. 26, 2009.
Amendment dated Sep. 27, 2012, in U.S. Appl. No. 12/412,280 filed Mar. 26, 2009.
Office Action dated Jun. 20, 2012, in Chinese Patent Application 200910211563.4.
Preliminary Amendment filed on Nov. 13, 2009, in U.S. Appl. No. 12/582,659.
Office Action dated Apr. 4, 2013, in U.S. Appl. No. 12/582,659.
Amendment filed May 22, 2013, in U.S. Appl. No. 12/582,659.
Notice of Allowance and Fees Due dated Jun. 14, 2013, in U.S. Appl. No. 12/582,659.
Preliminary Amendment filed on Sep. 14, 2009, in U.S. Appl. No. 12/412,280 filed Mar. 26, 2009.
Notice of Allowance and Fees due dated Aug. 21, 2013, in U.S. Appl. No. 13/229,596.

* cited by examiner

| Date | Time | Highband EQ | Lowband EQ | DC Gain |
|---|---|---|---|---|
| 01/01/2012 | 12:00 AM | 187 | 3 | 32 |
| 01/01/2012 | 12:00 PM | 186 | 3 | 32 |
| 01/02/2012 | 12:00 AM | 188 | 3 | 32 |
| 01/02/2012 | 12:00 PM | 185 | 3 | 32 |
| 01/03/2012 | 12:00 AM | 227 | 5 | 28 |
| 01/03/2012 | 12:00 PM | 225 | 5 | 28 |
| 01/04/2012 | 12:00 AM | 226 | 5 | 28 |
| 01/04/2012 | 12:00 PM | 228 | 5 | 28 |
| ... | ... | ... | ... | ... |

FIG. 7

CABLE EQUALIZATION AND MONITORING FOR DEGRADATION AND POTENTIAL TAMPERING

PRIORITY CLAIMS

This application claims priority under 35 U.S.C. 119(e) to U.S. Provisional Patent Application No. 61/495,159, entitled "Cable Equalization and Monitoring For Degradation and Potential Tampering", filed Jun. 9, 2011.

RELATED APPLICATIONS

This application is related to the following co-pending and commonly assigned patent applications:

U.S. patent application Ser. No. 12/582,659, entitled "Cable Equalization Locking", filed Oct. 20, 2009;

U.S. patent application Ser. No. 12/412,280, entitled "Systems and Methods for Cable Equalization", filed Mar. 26, 2009; and U.S. patent application Ser. No. 13/229,596, entitled "Systems and Methods for Detecting Tampering with Video Transmission Systems", filed Sep. 9, 2011.

BACKGROUND

Category 5 (CAT5) is an Ethernet cable standard defined by the Electronic Industries Association and Telecommunications Industry Association (EIA/TIA). CAT5 cable, which includes four unshielded twisted-pairs of wire, was originally intended to support Fast (100 Mbps) Ethernet and comparable alternatives such as Asynchronous Transfer Mode (ATM). As with all other types of twisted pair EIA/TIA cabling, CAT5 cable runs are intended to be limited to a maximum recommended run rate of 100 m (328 feet).

The ubiquity and cost-effectiveness of CAT5 cabling make it an attractive choice for video distribution. Hotels and office buildings are perfect environments for video distribution, and are often already wired with CAT5 unshielded twisted-pair (UTP) cable. CAT5 is also cheaper and easier to install than coaxial cable. However, CAT5 cable was originally not intended for high bandwidth video signal applications, since it has substantial attenuation as frequencies increase. In video applications, high frequencies are used to represent both sharp image details and color information. Thus, this attenuation can seriously impact picture quality. Accordingly, there is a need to overcome the high frequency attenuation that occurs when using CAT5 cable, or similar cable, for video signal transmission.

Since unshielded twisted-pair (UTP) cables are now being used for video transmission, companies have begun to design receivers and equalizers that specifically compensate for the high frequency attenuation caused by such cables. One example of this is the EL9110 Differential Receiver/Equalizer available from Intersil Corporation, of Milpitas, Calif. This device accepts a control voltage signal that can be used to set the compensation levels required for different lengths of cable. Thus, if a specific receiver/equalizer is always receiving a video transmission over the same cable of unchanging length, the compensation level at the receiver/equalizer can be manually set once, and video signals should be correctly compensated thereafter. However, a challenge exists where a receiver/equalizer can receive video transmission from various different transmitters, over cables of various different lengths, such as may occur in a building that is wired for video conferencing. In such a case, each time a receiver receives a video transmission over a cable of a different length, the compensation level needs to be adjusted. It would be beneficial if systems and methods were available to perform such adjustments. It would also be beneficial if such adjustments could be automatic.

The above described cables, receivers and equalizers are often used in video surveillance systems to carry, receive and equalize surveillance video signals. Because such video surveillance systems are often used for security and other safety purposes, it is desirable to maintain and secure such systems, and the video signals carried by such systems.

SUMMARY

Certain embodiments of the present invention are directed to systems and methods that provide automatic compensation for frequency attenuation of a video signal transmitted over a cable. In accordance with an embodiment, such a system includes an equalizer and a compensation controller. The equalizer receives a video signal that was transmitted over a cable, provides compensation for frequency attenuation that occurred during the transmission over the cable, and outputs a compensated video signal. The compensation controller automatically adjusts the compensation provided by the equalizer based on comparisons of one or more portions of the compensated video signal to one or more reference voltage levels.

In accordance with specific embodiments, the system also include memory and/or registers that store, for each of a plurality of times, one or more values indicative of one or more levels of compensation provided by the equalizer at the time. Such values can include a value indicative of the level of high band equalization, a value indicative of the level of low band equalization and/or a value indicative of the level of DC gain, but are not limited thereto. Additionally, the system can include a monitor that monitors for changes in the cable and/or the video signal transmitted over the cable based on the stored values. The monitor can also selectively trigger an alert based on changes in the one or more stored values. The monitor can monitor for changes indicative of potential tampering of the cable and/or video signal. Additionally, or alternatively, the monitor can monitor for changes indicative of degradation of the cable and/or video signal.

In accordance with an embodiment, the monitor can trigger an alert in response to detecting, based on the stored values: a change in at least one type of value that exceeds a corresponding threshold; a change in at least one type of value that exceeds a corresponding threshold within a predetermined amount of time; or a rate of change in at least one type of value that exceeds a corresponding threshold.

This summary is not intended to summarize all of the embodiments of the present invention. Further and alternative embodiments, and the features, aspects, and advantages of the embodiments of invention will become more apparent from the detailed description set forth below, the drawings and the claims.

BRIEF DESCRIPTION OF THE DRAWINGS

FIG. 7 is an exemplary table that includes stored values indicative of the level of high band equalization, low band equalization and DC gain, which can be used to monitor for potential tampering and/or degradation of a cable and/or video signal, in accordance with specific embodiments of the present invention.

DETAILED DESCRIPTION

Figure 1A:
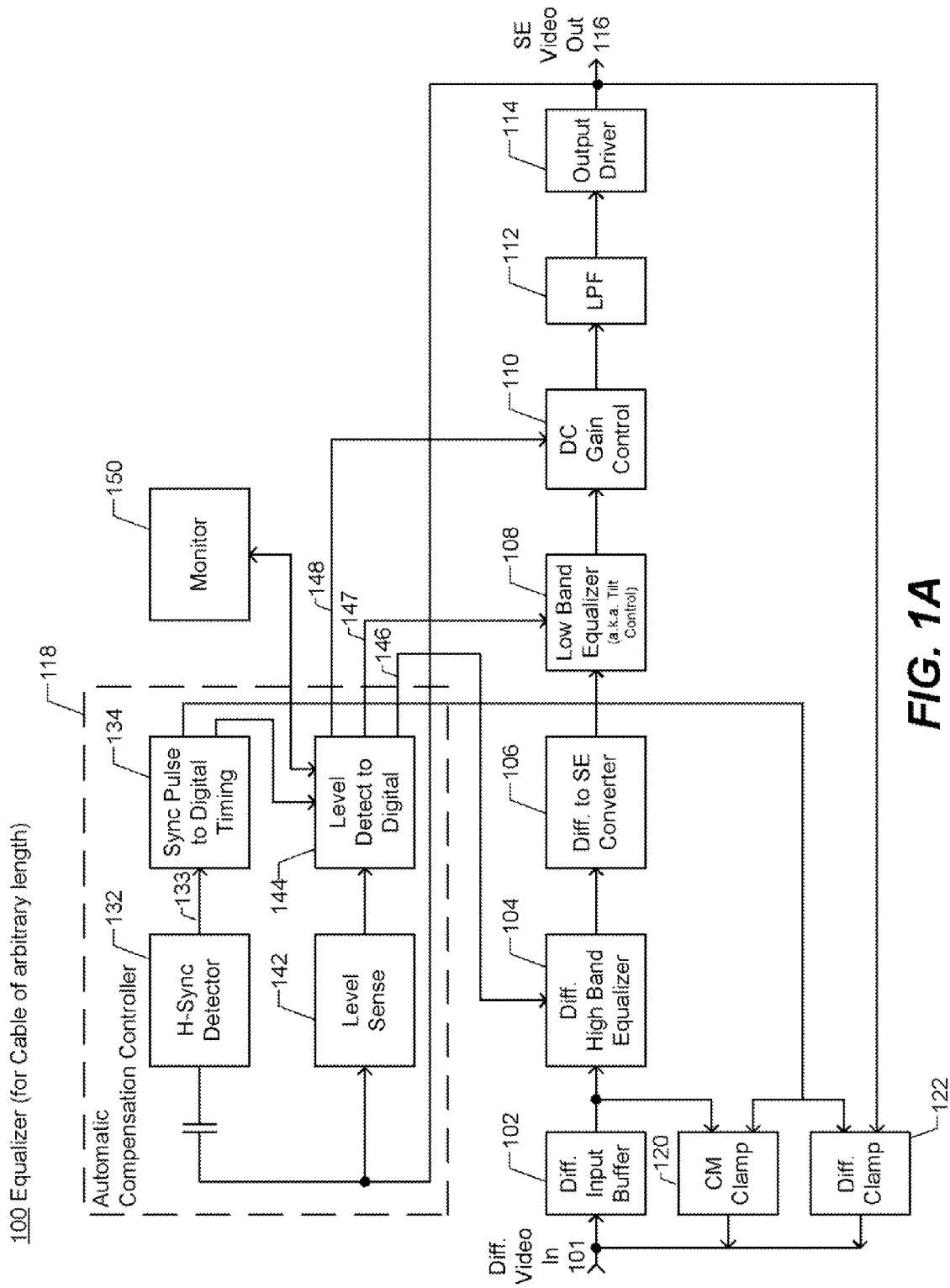
FIG. 1A is a high level block diagram of an equalizer, according to an embodiment of the present invention, that provides for automatic compensation of a video signal received through a length of cable (e.g., up to a mile, or even longer) of arbitrary length.

FIG. 1A is a high level block diagram of an equalizer 100, according to an embodiment of the present invention, which can be used to recover a signal received through a long length of cable (e.g., up to a mile, or even longer), where the cable can be any arbitrary length. The cable could be a CAT5 cable or a CAT6 cable, but is not limited thereto. Such a signal is sent differentially across two wires of such cable, e.g., a twisted pair of wires, in the case of a CAT5 or CAT6 cable. The received signal can be, e.g., a NTSC video signal, or some other type of video signal. The equalizer 100 compensates for the high frequency attenuation, and to a lesser extent low frequency attenuation, caused by the cable and, and the equalizer 100 outputs a compensated video signal 116. The frequency compensation provided by the equalizer 100 should be appropriate to the length of the cable and the type of the cable that caused the frequency attenuation. The compensated video signal 116, once properly compensated, is substantially equivalent in frequency and phase content to the video signal before its content was altered by the cable. In the FIG. 1A and the other FIGS., "SE" stands for "single ended" and "Diff." stands for "differential".

Referring to FIG. 1A, the equalizer 100 is shown as including a differential input buffer 102, a differential high band equalizer 104, a differential to single ended converter 106, a low band equalizer 108, a DC gain control circuit 110, a low pass filter 112 and an output driver 114. Additionally, the equalizer 100 is shown as including an automatic compensation controller 118, which automatically adjusts a high frequency compensation control signal 146, a low frequency compensation control signal 147, and a DC gain control signal 148, so that the compensated video signal 116 output by the equalizer 100 is correctly compensated. More generally, the automatic compensation controller 118 controls the high band equalizer 104, the low band equalizer 108 and the DC gain control circuit 110.

Note that there is some flexibility in the order of the signal processing blocks. For example, the low pass filter 112, DC gain and low band equalizer 108 can occur anywhere after the high band equalizer 104. However, due to noise considerations, the high band equalizer 104 should either be at the input, or immediately following the input buffer 102. The video signal only needs to become single-ended by the time it reaches the output, so the differential to single ended converter 106 can be anywhere between the input and the output driver 114. However, concerns regarding noise and supply isolation lead to the preference that the high band equalizer 104 be implemented in the differential mode. It is also possible that further processing blocks be included, such as, but not limited to, a group delay equalizer that is used to ensure color fidelity.

The video signal 116 output by the equalizer 100 is provided to both a horizontal sync (H-sync) detector 132, and a level sense detector 142. The H-sync detector 132 outputs a horizontal sync signal 133, which is provided to a sync pulse to digital timing circuit 134. In a well known manner, the circuit 134 can lock to the H-sync pulses, detect the timing of the leading and/or trailing edges of the H-sync pulses (preferably the trailing edges) within lines of the video signal 116. Based on such detected timing, other portions of lines of the video signal 116 can be detected, including, e.g., the blanking level portion and the color burst portion (if the video signal is a color signal). Additionally, the beginning of the next H-sync pulse can be detected. The blanking level is the nominal voltage of a video waveform during the horizontal and vertical periods, excluding the more negative voltage sync tips. Using this knowledge of the various portions of the video signal 116, the level detect to digital circuit 144 can provide appropriate pulses for sampling the various portions of the video signal 116, and together with the level sense detector 142 can perform selective comparisons of the various portions of the video signal 116 to appropriate reference voltages, including a blanking level reference voltage, a burst level reference voltage, a sync level reference voltage and a monochrome reference voltage. In accordance with an embodiment, the monochrome reference voltage is set between the blanking level reference voltage and the burst level reference voltage, and can be used to determine whether the video signal is a color or monochrome signal. Additional details of the level sense detector 142 and the level detect to digital circuit 144 are discussed below with reference to FIG. 4.

The differential input buffer 102 prevents the equalizer 100 from loading and interfering with operation of the cable (e.g., cable 504 in FIG. 5A) and the transmitter (e.g., 502 in FIG. 5A) on the far end of the cable. Such functionality of the differential input buffer 102 can be provided by a first stage (e.g., G0 or G1 in FIGS. 2A & 2B) of the differential high band equalizer 104, and thus, the input buffer 102 need not be included in some configurations. This buffer 102 can also provide a high input impedance which best allows a common mode (CM) clamp 120 and a differential clamp 122 to correctly drive an input coupling capacitor pair.

The differential high band equalizer 104, which is controlled by the high frequency compensation control signal 146, boosts the high frequencies of the received differential video signal 101. Additional details of the differential high band equalizer 104, according to an embodiment of the present invention, are discussed below with reference to FIGS. 2A and 2B.

A differential to single ended converter 106 converts the differential output of the high band equalizer 104 to a single ended signal, so that further processing of the signal, including low band equalization and gain control, can be performed on a singled ended signal. Alternatively, the single ended converter 106 can be removed, or performed further downstream, and all or some of the further processing can be performed differentially. In fact, the compensated video output signal 116 can be a differential signal in some applications/implementations.

The low band equalizer 108, which is controlled by the low frequency compensation control signal 147, performs boosting of the low frequencies of the received video signal 101. Additional details of the low band equalizer, according to an embodiment of the present invention, are discussed below with reference to FIG. 3.

The DC gain control 110, which is controlled by the DC gain control signal 148, fine tunes DC gain of the amplifier so that horizontal sync pulses within the compensated video signal 116 have a predetermined nominal level. In this manner, the DC gain control 110 can compensate for non-standard video levels originating from the video source.

Since video signals typically have frequencies of interest from about 30 Hz to about 6 MHz, the low pass filter 112 can have a cut-off frequency of about 6.5 or 7 MHz, but is not limited thereto. In alternative embodiments, the low pass filter 112 can be located between the differential to single ended converter 106 and the low band equalizer 108, or between the low band equalizer 108 and the DC gain control circuit 110.

The output driver 114 can be, e.g., a 75 Ohm output driver, but is not limited thereto.

Still referring to FIG. 1A, the equalizer 100 is also shown as including a common mode (CM) clamp 120 and a differential clamp 122. The CM clamp 120 samples the common mode of the first stage of the equalizer 100, which can be the differential input buffer 102, or as explained with reference to FIG. 2A, can be a first stage (e.g., $202_0$) of the differential high band equalizer 104. The CM clamp 120 feeds back a common mode current, which in conjunction with the input coupling capacitors, (with the same current for both differential inputs) establishes the common mode level at the input. The differential mode clamp 122 senses the compensated video output signal 116 (SE Video Out) and feeds back a differential current to the input which in conjunction with the input coupling capacitors, (Diff. Video In) establishes the desired differential voltage. Measurements done at the output are relative to the reference level established by this clamp 122. The reference level can be, e.g., ground, or for a single supply circuit can be VDD/2, but is not limited thereto. Both clamps 120 and 122 can be sampled by a same clamp pulse generated by the sync pulse to digital timing circuit 134. The clamp pulse can occur in the back porch area of the video following the sync pulse. This is the traditional black level (or more correctly, blanking level) for composite video. Stated more generally, the clamps 120 and 122 force a specific portion (either the back porch or the sync tip) of the video signal to a specific DC voltage, to restore the DC level and maintain an internal operating range that ensures substantially linear operation of the internal circuitry.

In accordance with an embodiment of the present invention, vertical sync (V-sync) pulses are ignored when providing automatic compensation for frequency attenuation of a video signal transmitted over a cable. Thus, V-sync pulses should be distinguished from H-sync pulses, which can be done in various manners. For example, it is known that V-sync pulses are longer than H-sync pulses. Thus, V-sync pulses and H-sync pulses can be distinguished based on their length. In a specific embodiment, V-sync pulses and H-sync pulses can be distinguished by detecting the sync level using both the H-sync detector 132 and the level sense detector 142. Once an internal timer is locked to sync pulses, the sync level can be sensed at various points in a line, e.g., at 25% and/or 75% points in the line (timing-wise). A counter can be reset on the first of these points, and can be increment once per line (e.g., at the H-sync pulse edges). In an embodiment, the control loops used for automatic compensation for frequency attenuation are only updated on lines that are well past the vertical interval (e.g., lines 25 onward), and before the start of the next line that would include a vertical sync pulse (e.g., 262.5 lines after a previous V-sync pulse in NTSC, or 312.5 lines in PAL).

The equalizer 100 in FIG. 1A is also shown as including a monitor 150 that can detect potential tampering and/or degradation of a cable and/or video signal, in accordance with specific embodiments of the present invention, described in additional detail below. As shown in FIG. 1A, the monitor 150 can communicate with the level detect to digital circuit 144.

Figure 1B:
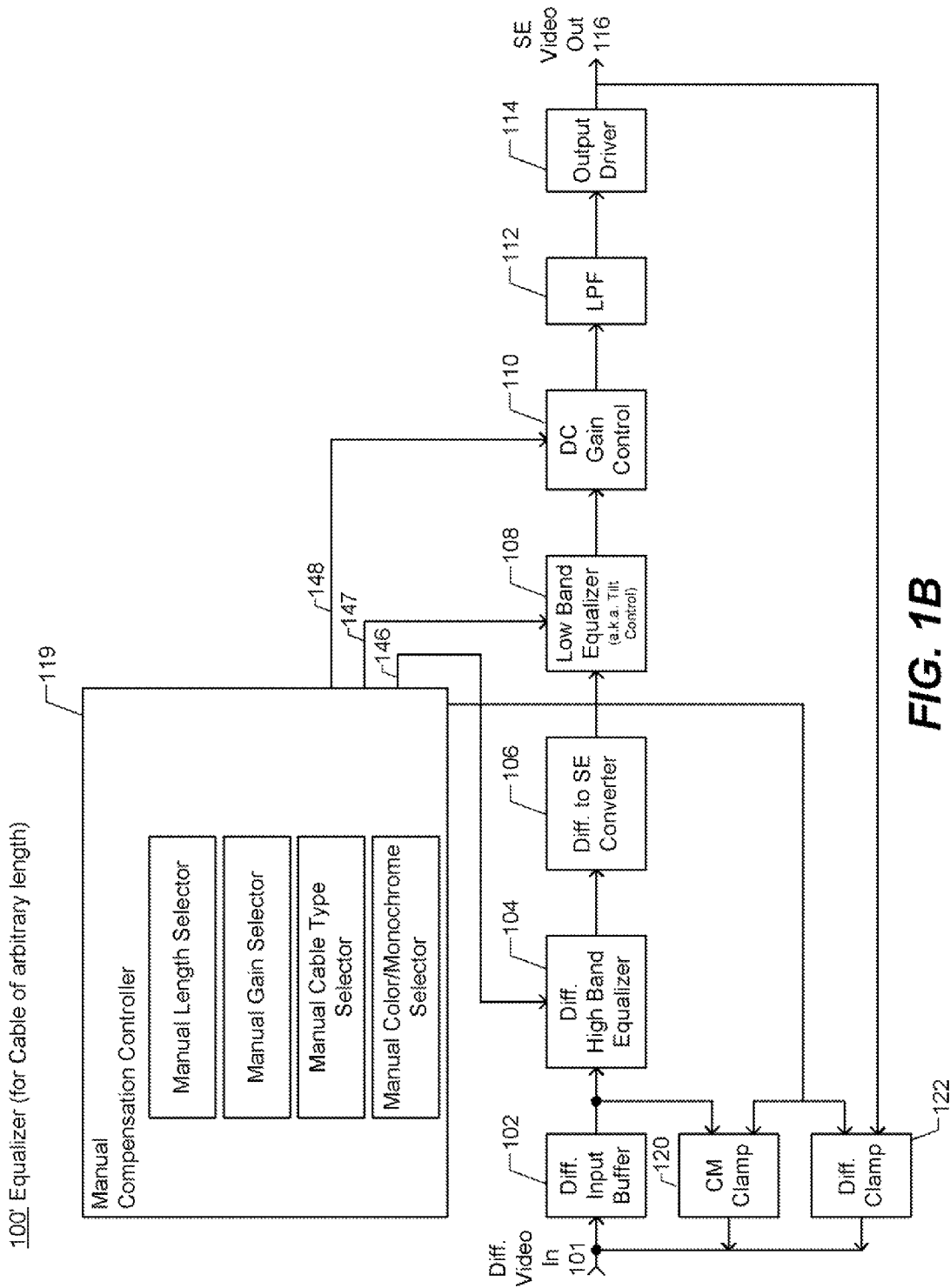
FIG. 1B is a high level block diagram of an equalizer, according to an embodiment of the present invention, that provides for manual compensation of a video signal received through a length of cable (e.g., up to a mile, or even longer) of arbitrary length.

FIG. 1B is a high level block diagram of an equalizer 100', according to another embodiment of the present invention, that provides for manual compensation of a video signal 101 received through a long length of cable (e.g., up to a mile, or even longer) of arbitrary length. The equalizer 100' includes a manual compensation controller 119 that allows a user to make manual compensation adjustments, e.g., using knobs, switches, sliders, buttons, a graphical user interface, or the like. For example, the output video signal 116 can be provided to a display monitor (or video waveform monitor or vectorscope, or any other type of suitable video test equipment), and the user can manually make adjustments until the video image on the display monitor is optimized, or at least satisfactory, and based on the type of cable, and whether the signal is color or monochrome (e.g., black and white).

Figure 2A:
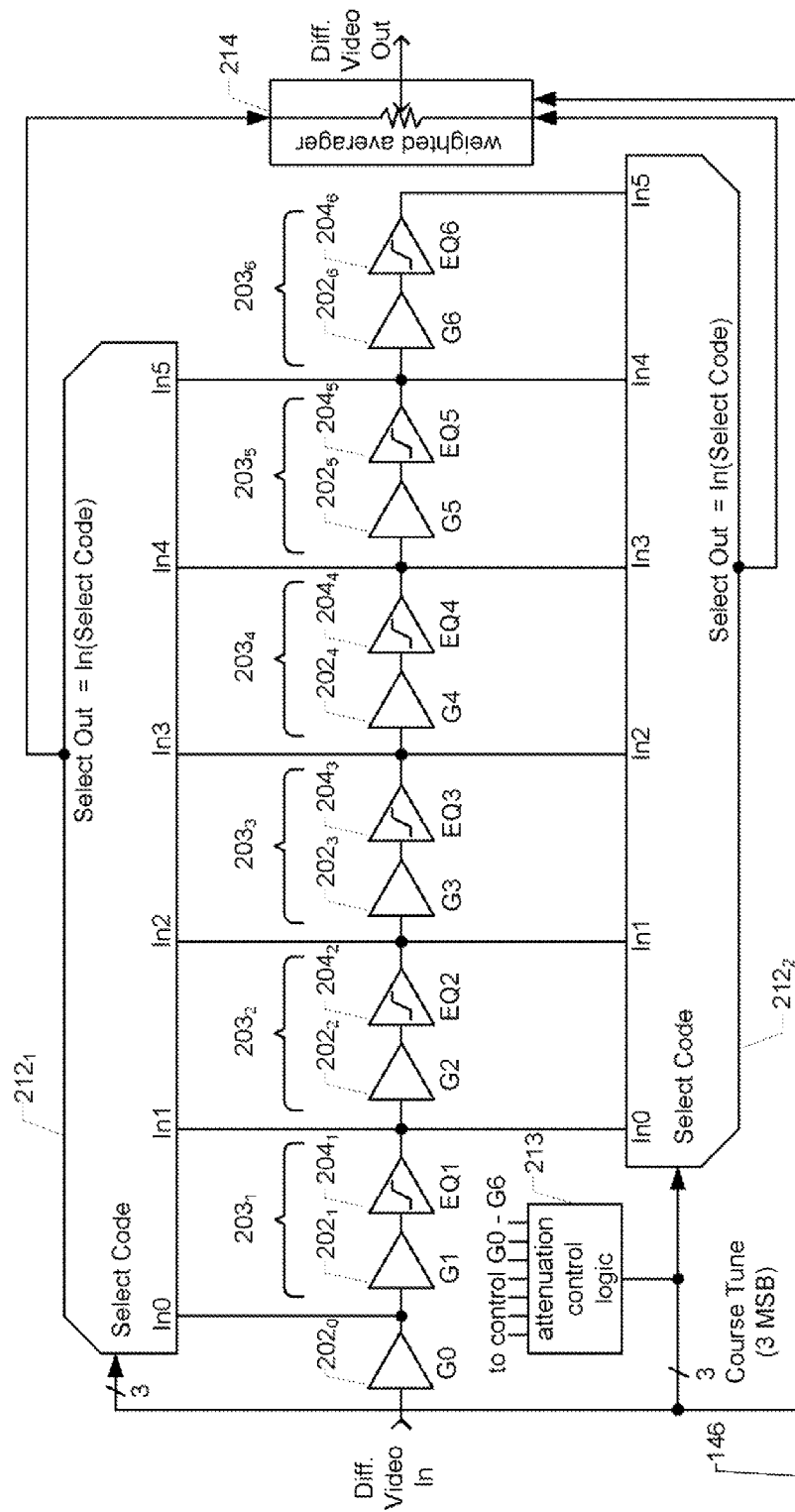
FIG. 2A is a block diagram that shows details of the high band equalizer block of FIGS. 1A and 1B, according to an embodiment of the present invention.

FIG. 2A is a high level block diagram of the high band equalizer 104, according to an embodiment of the present invention. Note that the various stages, the inputs and the outputs shown in FIG. 2A, are differential signals, but that single lines have been drawn so at to not unnecessarily clutter the figure. Referring to FIG. 2A, the high band equalizer 104 is shown as including six equalizer stages $204_1$-$204_6$, each of which is associated with a corresponding attenuation stage $202_1$-$202_6$. The attenuation stage $202_n$, either passes through the signal at its input (i.e., provides no attenuation), or provides a predetermined (e.g., −6 dB) amount of attenuation, where such attenuation can be used to prevent overload of an equalizer stage $204_{n+1}$. For simplicity, an attenuation stage $202_n$ and its corresponding equalizer stage $204_n$ can collectively be referred to simply as an equalizer stage $203_n$.

In accordance with an embodiment of the present invention, each successive equalizer stage 204 provides high frequency boosting for an additional equal length of cable (e.g., an additional 1000 feet of cable), in the frequency range of about 500 kHz to about 6 MHz, with each equalizer stage having a slightly different equalization curve than the other equalizer stages. Further, each equalizer stage $204_1$-$204_6$ can be designed to boost the signal at the upper frequency of interest (e.g., 6 MHz) by a same amount (e.g., about 12 dB) while boosting the signal at a lower frequency of interest (e.g., 1 MHz) by a lower amount (e.g., about 5 dB), with the DC Gains between 0 dB and 1 dB. Accordingly, the total sequentially (i.e., serially) connected chain of equalizer stages $204_1$-$204_6$ can be capable of approximately 6*12 dB (i.e., 72 dB) of boost. Since each additional equalizer stage 204 compensates for an additional length (e.g., an additional 1000 feet) of cable, selecting one of the outputs of these discrete equalizer stages alone would results in too crude a resolution to accurately equalize a cable of arbitrary length (e.g., a 3024 foot cable).

In accordance with an embodiment, to provide for less crude (i.e., more fine) resolution, a pair of selectors $212_1$ and $212_2$ (e.g., each of which can be a multiplexor) and a weighted averager 214 (e.g., a multi-position fader, such as a 64 position fader) are used to interpolate or otherwise combine the outputs of two adjacent equalizer stages 204. Stated an equivalent way, the weighted averager 214 can be used to combine the input and the output of the last active equalizer stage 203. For example, where the weighted averager is a 64 position fader, and each equalizer stage $204_n$ compensates for an additional 1000 feet of cable, this weighted averager 214 allows fine tuning the equalization to $\frac{1}{64}$ of 1000 feet (~16 feet).

In the embodiment shown, each selector 212 includes six differential inputs (In0-In5) and one differential output, which is selected, e.g., by a three bit input. In accordance with an embodiment, each attenuation stage 202 can be capable of selecting between no attenuation and a predetermined attenuation level (e.g., −6 dB). More or less equalizer stages 203 can be used, in alternative embodiments of the present invention. If a different total number of equalizer stages 203 are used, then the selectors 212 may have more or less inputs. In other words, alternate implementations can have more equalizer stages with less boost per stage, or less stages with more boost per stage, with a corresponding change in the number of inputs to selectors 212.

Figure 2B:
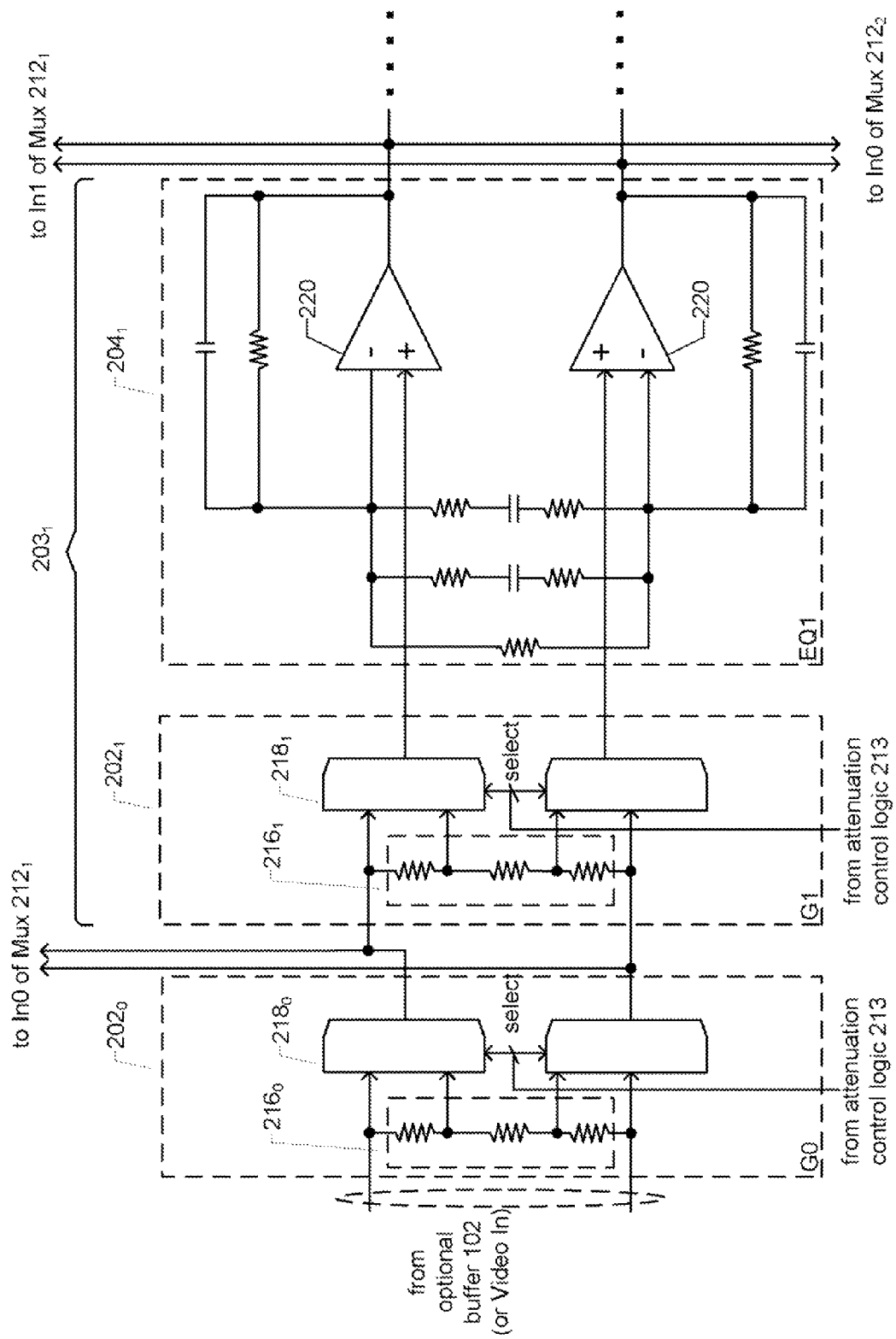
FIG. 2B is a diagram that provides exemplary details of the equalizer stages of FIG. 2A, according to an embodiment of the present invention.

Referring to FIG. 2B, each attenuation stage (e.g., $202_0$ and $202_1$ in FIG. 2B) can be implemented using a resistor ladder 216 and a pair of 2-input/1-output multiplexors 218, or 2-input/1 output weighted averagers 214 (e.g., faders). Block 218 can selects between a non-attenuated signal path (not stepped down by the resistor ladder 216) and a stepped down version of the signal (which has been stepped down by the resistor ladder 216), or potentially variations in-between. For example, the output of block 218 can be adjustable to select either of its two inputs, the mean of its two inputs, or any weighted average of its two inputs, to within the resolution of the number of bits controlling it. In one embodiment 6 control bits are used, but more or less bits are possible depending on the required resolution/flatness of the system. Still referring to FIG. 2B, in accordance with an embodiment, each equalizer stage 204, which accepts a differential input, can be implemented by a pair of operational amplifiers 220 configured as non-inverting amplifiers, or a single differential operational amplifier can be used. For example, equalizer stage $204_1$ in FIG. 2B can be equivalently implemented using a differential amplifier or differential op-amp in conjunction with resistors and capacitors that implement an equivalent response. The values of the resistors and capacitors within a specific equalizer stage 204 should be optimized for the length of cable for which that equalizer stage is to perform compensation. For example, referring back to FIG. 2A, the equalizer stage $204_1$ can be optimized for a first 1000 feet of cable, the equalizer stage $204_2$ can be optimized for a second 1000 feet of cable, . . . and the equalizer stage $204_6$ can be optimized for a sixth 1000 feet of cable. The high levels of required signal boost present a headroom issue. One solution to this headroom issue would be to attenuate the input signal 101, but the large amount of required equalization boost presents a noise problem, since the noise of the input stage is multiplied by the amount of selected boost which can exceed 60 dB with as much as another 12 dB of excess boost internal to the equalizer. To achieve the lowest reasonable input stage noise, the input preferably should not be attenuated, but rather should be amplified, before reaching the equalizer. Accordingly, it would be preferable that the gain stage $202_0$ not be present, or if present, provide for unity gain. Thus, the high band equalizer 104 should operate at the largest signal swing possible to minimize its contribution to output noise. This low noise requirement is in conflict with the potential overload created by the unused portion of the last active equalizer stages 204 (this phenomenon of overload is explained in more detail below).

An alternate implementation could incorporate more equalizer stages, each stage with a more modest level of boost, proportionally reduced by the ratio of increase in stages, e.g., using twice the number of stages, each stage with 6 dB less gain results in an equivalent equalization. These variants are impractical since they require more power and more amplifiers and are thus more expensive to implement and maintain. Accordingly, it would be beneficial to address the overload issue without significantly reducing input stage gain (to keep noise low) and without enlarging the equalizer by implementing more boost stages with less boost per stage (to keep cost low).

Potential overload occurs under any conditions where there is more boost equalization in the signal chain than is required to equalize the signal to have a flat frequency response. The root cause of overload conditions can be understood by examining the circuit in FIG. 2A, where six equalizer stages 204 are shown. If all these stages are enabled (i.e., kept in the signal chain) regardless of the cable length, then unless a very long cable is used, overload will occur. Consider the extreme case of a zero-length cable. The output of the first equalizer stage $204_1$ will be boosted by 12 dB at 6 MHz; and the output of the last equalizer stage $204_6$ will be boosted by 70 dB at 6 MHz. These levels of boost will overload any practical amplifier. Now consider another example where 4000 feet of cable are used. Now the output of the 4 th equalizer stage $204_4$ will be flat, but the $5^{th}$ stage $204_5$ will have 12 dB of excess boost and the following $6^{th}$ stage $204_6$ will have 24 dB of excess boost. To avoid overloads, all un-necessary equalizer stages should be disabled or at least not use to produce the compensated video signal output. For an arbitrary cable length, equalizing its response using the simple string of equalizer stages (6 stages in the embodiment shown), can result in either excess equalization or in-adequate equalization. The only exceptions would be for cable lengths of exactly 0 feet, 1000 feet, 2000 feet, 3000 feet, 4000 feet, 5000 feet, and 6000 feet (again, assuming each gain stage 204 provided for equalization of an additional 1000 feet).

The use of the selectors $212_1$ and $212_2$ in FIG. 2A essentially allows for the disabling of any unnecessary equalizer stages to avoid overload, while also providing for interpolation. For example, where the In2 inputs of selectors $212_1$ and $212_2$ are selected, the output of the equalizer stage $203_2$ (which is also the input to the equalizer stage $203_3$) is provided by the selector $212_1$ to one differential input of the weighted averager 214, and the output of the equalizer state $203_3$ is provided by the other selector $212_2$ to the other differential input of the weighted averager 214. A multibit (e.g., 9 bit) control signal 146 generated by compensation controller 118 or 119 can control the selectors $212_1$ and $212_2$ and the weighted averager 214, with the most significant bits (e.g., 3 MSBs) performing course tuning by controlling the selectors $212_1$ and $212_2$, and the least significant bits (e.g., 6 LSBs) performing fine tuning by controlling the weighed averager 214. In this example: the equalizer stages $203_1$, $203_2$ and $203_3$ can be considered enabled or active, since they affect the signal produced by the weighted averager 214; and the equalizer stages $203_4$, $203_5$ and $203_6$ can be considered disabled or inactive, since they do not affect the signal produced by the weighted averager 214.

The weighted averager 214 interpolates between the outputs of the last two active equalizer stages 203, or equivalently, between the input and output of the last active equalizer stage 203. Overload can occur, because to achieve a composite response that is flat (the composite response is defined as the cable's response multiplied by the equalizer's response), there is typically some excess boost that is not brought to the equalizer's output, but exists at the output of the last active equalizer stage. For a hypothetical example, if the cable were 4016 feet, the correct equalization would be derived by selecting the 4000 foot and 5000 foot outputs of the equalizer stages (equivalently the input and output of the 5000 foot equalizer stage), and then interpolating between them by selecting the an appropriate weighted average (e.g., a lowest fader tap of a 64 position fader) which corresponds to an equalization of 4000 feet plus 16 feet. This results in the appropriate equalization, but it produces a side effect in that the signal at the 5000 foot output tap is 12 db larger at 5 MHz than the correctly equalized ("flat") signal amplitude. Since signal swing (against a limited headroom) has already been maximized to reduce noise, this 12 dB of unwanted boost exceeds the allowable signal level by ~4×. This can be solved in practice as a compromise by reducing the input gain by 6 dB (using attenuation stage $202_0$) and causing a 6 db attenuation into the last active equalizer stage 203. This compromise maintains reasonable signal-to-noise while avoiding an overload in the signal chain. In other words, each equalizer stage $203_n$ can have a selectable 0 dB/6 dB attenuator $202_n$ at its input.

The attenuator $202_0$ provides for pass-through for all cases where more than the first equalizer stage $202_1$ is active, and for attenuation (e.g., –6 dB) where only the first equalizer stage $202_1$ is active. Putting the attenuator $202_0$ in front of the first equalizer stage $203_1$ increases noise (e.g., by 6 dB), but this only increases noise for cases of short cable runs where the high frequency boost is limited to at most 12 dB. The added noise is harmless in the context of such modest levels of equalization boost.

While most equalizers are viewed in the frequency domain, they can also be viewed in the time domain. This involves the impulse response of both the cable and the equalizer stage(s). In accordance with an embodiment, an algorithm takes the cable transfer function and determines the best location, e.g., for a two pole/two zero equalizer stage that minimizes the waveform distortion in the time domain. One could simply put a known waveform (a square pulse, for example) through 1000 feet of cable, and adjust the resistors and capacitors of an equalizer stage 204 to minimize the distortion. Alternatively, an algorithm can do this automatically and optimally. A further point of the algorithm is to use the first stage to compensate a 2000 foot length of cable, and apply the algorithm (or adjust the resistors and capacitors of a second stage) to minimize the distortion of a square pulse travelling through 2000 feet of cable and two equalizer stages 204. After the first stage $204_1$ has been optimized for the 1 st 1000 feet of cable, then the second stage $204_2$ is optimized for the 2nd 1000 feet, etc. Other methods can be similarly applied by viewing the frequency response error on a network analyzer. In any case, the next stage is always optimized by applying the previously determined stages to a longer length of cable along with the next stage. This minimizes accumulated error and effectively creates a multi-pole/multi-zero equalizer (e.g., a 2 pole/2 zero equalizer for 1000 feet of cable, a 4 pole/4 zero equalizer for 2000 feet of cable . . . or a 12 pole/12 zero equalizer for 6000 feet of cable), making it extremely accurate and robust.

The equalizer stages $204_1$ to $204_6$ are sequential, so their effect is cumulative. In accordance with an embodiment of the present invention, each equalizer stage 204 of the high band equalizer 104 has a transfer function equal to the inverse of the transfer function of the incremental length of cable for which the equalizer stage is intended to perform high band frequency compensation. More specifically, each successive equalizer stage has a transfer function equal to the inverse of the transfer function of the sub-length of cable for which the equalizer stage 204 is intended to perform high band frequency compensation, assuming all the earlier equalizer stage(s) are within the signal path. For example: the equalizer stage $204_3$ can have a transfer function equal to the inverse of the transfer function of the third 1000 feet of cable, for which the equalizer stage $204_3$ is intended to perform high band frequency compensation, assuming that equalizer stages $204_2$ and $204_1$ are within the signal path; the equalizer stage $204_2$ can have a transfer function equal to the inverse of the transfer function of the second 1000 feet of cable, for which the equalizer stage $204_2$ is intended to perform high band frequency compensation, assuming the equalizer stage $204_1$ is within the signal path; and the equalizer stage $204_1$ can have a transfer function equal to the inverse of the transfer function of the first 1000 feet of cable, for which the equalizer stage $204_1$ is intended to perform high band frequency compensation.

In accordance with an embodiment, the attenuator 202 of the second to last active equalizer stage 203 is the only attenuator that should provide attenuation (e.g., –6 dB). In another embodiment, the attenuator 202 of the last active equalizer stage 203 is the only attenuator that should provide attenuation (e.g., –6 dB), and an attenuator is added at the output of the selector $212_1$. Both of these embodiments will ensure that the signals provided to the weighted averager 214 have the same amplitude. For either embodiment, attenuator control logic 213 shown in FIG. 2B, can determine and control which attenuator 202 should provide attenuation based on the same course tune signal that controls the selectors 212 (e.g., by controlling the switches 214 in FIG. 2B).

Figure 3:
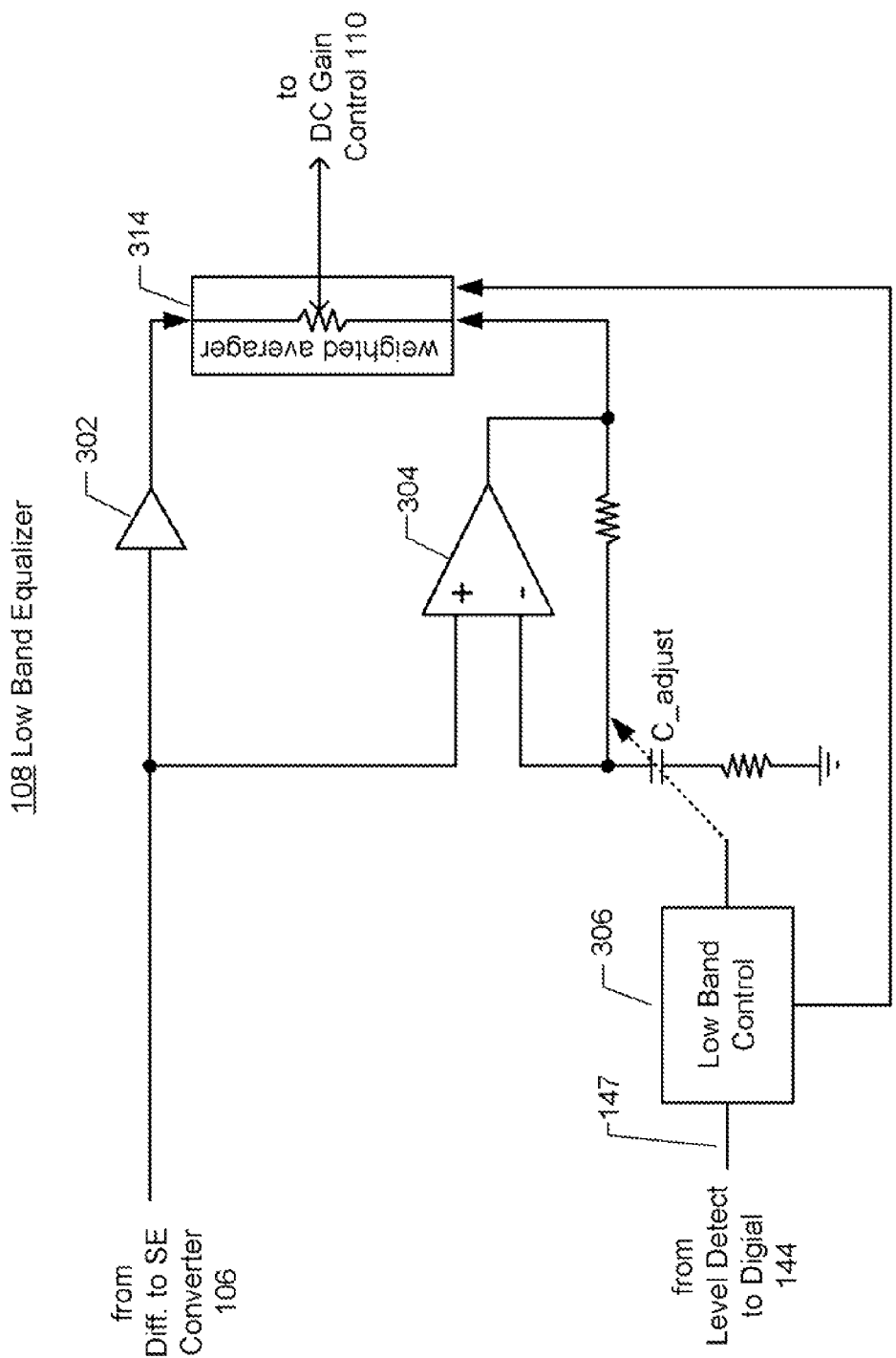
FIG. 3 is a diagram that provides exemplary details of the low band equalizer of FIGS. 1A and 1B, according to an embodiment of the present invention.

Additional details of the low band equalizer 108, according to an embodiment of the present invention, will now be described with reference to FIG. 3. In accordance with an embodiment, the low band equalizer 108 includes a unity gain buffer 302 and operational amplifier 304 configured as a non-inverting amplifier with, e.g., a gain factor of about 2 (i.e., about 6 db). The outputs of the buffer 302 and the amplifier 304 are provided to a weighted averager 314 (e.g., a multi-position fader, such as a 64 position fader). The weighted averager 314 and an adjustable capacitance C_adjust (e.g., a bank of capacitors connected in parallel that can be selectively switched into and out of the circuit) are controlled by a low band controller 306 which receives control signal 147 from the compensation controller 118 or 119. The low band controller 306, based on the signal 147, can use a look-up table (e.g., a look up ROM, or the like) to select the appropriate capacitance and weighting appropriate for the length of the cable. As the cable gets longer, both the pole and zero have to move down in frequency, which is accomplished by adjusting the capacitance C_adjust. Adjustment of the weighted averager 314 also affects the location of the zero(s) and pole(s). The above mentioned look-up can be based on all the bits, or just certain number of the most significant bits, of the signal 147. Additionally, all of the bits, or just certain number of the most significant bits, can be used to adjust the weighted averager 314. An alternative implementation could use a fixed capacitor with a variable resistor array. It is only required that the frequency response is substantially similar to what is implemented by FIG. 3A. Any alternate mode of implementation for low band equalizer 108 should be sufficient.

Low frequency attenuation caused by the cable results in the sync-tip being tilted in the time domain. Adjustments made by the low band equalizer 108 alter the tilt of the sync-tip of the H-sync pulse, and thus, the low band equalizer 108 can also be referred to as a tilt controller. When properly set, the sync-tip will have minimum tilt, i.e., have substantially zero slope.

The low band equalizer 108, because it is adjustable separate from the high band equalizer 104, enables the equalizer 100 (and 100') to not only compensate for various lengths of cable, but also various types of cable that have a different high to low band balance. For example, CAT5 cable and CAT6 cable have a different high to low band balance.

Additional details of the level sense circuit 142 and the level detect to digital circuit 144, both of the automatic compensation controller 118, will now be described with reference to FIG. 4. The level sense circuit 142 includes a set of comparators 402 (and 404) that compares the level of portions of the output compensated video signal 116 (in FIG. 1) to a set of reference voltages, including, blanking level, burst level and sync level reference voltages (and a monochrome reference voltage), as can be appreciated from FIG. 4. If a compared portion of the video output signal 116 is above the indicated reference voltage (monochrome, blanking level, burst level or sync level), then the corresponding comparator output will be high, otherwise it is low. The monochrome level, blanking level, burst level and sync level reference voltages can be their corresponding nominal values. For example, the blanking level can be nominally zero volts, the burst level can be nominally −150 mV, and the Sync level can be nominally −300 mV. There is a slight difference in these levels between the Phase Alternation by Line (PAL) and National Television System Committee (NTSC) standards, but this is not material to the invention. In accordance with an embodiment, all of these levels may be shifted to some other range for convenience, but the relationship remains.

The level detect to digital circuit 144 processes the outputs of the comparators 402 by using sense counters 412 to count the number of clock cycles each comparator 402 is high, during a relevant timing pulse (provided to one of two inputs of AND gates $408_n$. For example, the sense counter $412_1$ produces a count output indicative of the extent that the breezeway portion of a line of the compensated video signal 116 is greater than a nominal blanking level (e.g., 0 V); the sense counter $412_2$ produces a count output indicative of the extent that the color burst (if one exists) of a line of the compensated video signal 116 is greater than a nominal burst level (e.g., −150 mV); the sense counter $412_3$ produces a count output indicative of the extent that substantially the entire sync tip of a line of the compensated video signal 116 is greater than a nominal sync level (e.g., −300 mV); and the sense counter $412_4$ produces a count output indicative of the extent that a beginning portion of the sync tip of a line of the compensated video signal 116 is greater than a nominal sync level (e.g., −300 mV). The most significant bit (MSB) of each sense counter 412 will be either 0 or 1, and is used to cause one of the error integrator counters 414 to count up or down. The sense counters 412 are reset once per line of video (i.e., per H-sync).

When the compensated video signal output 116 is properly compensated for the length of the cable, the output of the error integrator counters 414 will be substantially constant. In an embodiment, the error integrator counters 414 can be selectively locked or prevented from counting up and down (e.g., be disabled), after proper compensation has been achieved, and it is determined that the length of cable is not changing. This can be done by monitoring the output of one of the sense counters (e.g., $412_1$), and determining that the length of cable is not changing if the outputs of that sense counter just prior to being reset deviates less than a specified amount.

Generally, the control loops including the comparators 402, sense counters 412 and error integrator counters 414 try to adjust equalization and gain so that each comparator 402 is high a specified percent (e.g., 50%) of the time. In an embodiment, the error integrator counters $414_1$, $414_2$ and $414_3$ generate the actual control signals (146, 147 and 148) for the loops. The longer the cable being compensated for, the higher the value of the high band control signal 146 output by the error integrating counter $414_1$, since the longer the cable the more high frequency compensation needed. Accordingly, referring back to FIG. 2A, the longer the cable, the greater the MSBs of the signal 146, and thus the more equalizer stages 203 that will be activated.

The output of the comparator 404, is averaged by an averager 405, and thereafter compared by the comparator 406 to a monochrome/color decision level reference, which is indicative of whether the video signal is a monochrome (e.g., black and white) video signal (which does not include a color burst) or a color video signal. The output of the comparator 406 controls a switch S1, so that the output of the appropriate sense counter $412_1$ or $412_2$ is provided to the input of the error integrator counter $414_1$. In this manner, the control loop for high band equalization is appropriately calibrated for monochrome or color video signal.

In accordance with an embodiment, if the sync pulse to digital timing circuit 134 loses lock of the H-sync pulses (e.g., because a different length of cable was switched in, e.g., by a multiplexor (mux) 506 shown in FIG. 5B), the various control loops discussed below can be reset to default levels (e.g., ratcheted back to zero), and the automatic compensation mechanism described above can restart. For example, all the counters 412 and 414 can be reset to zero.

Figure 4:
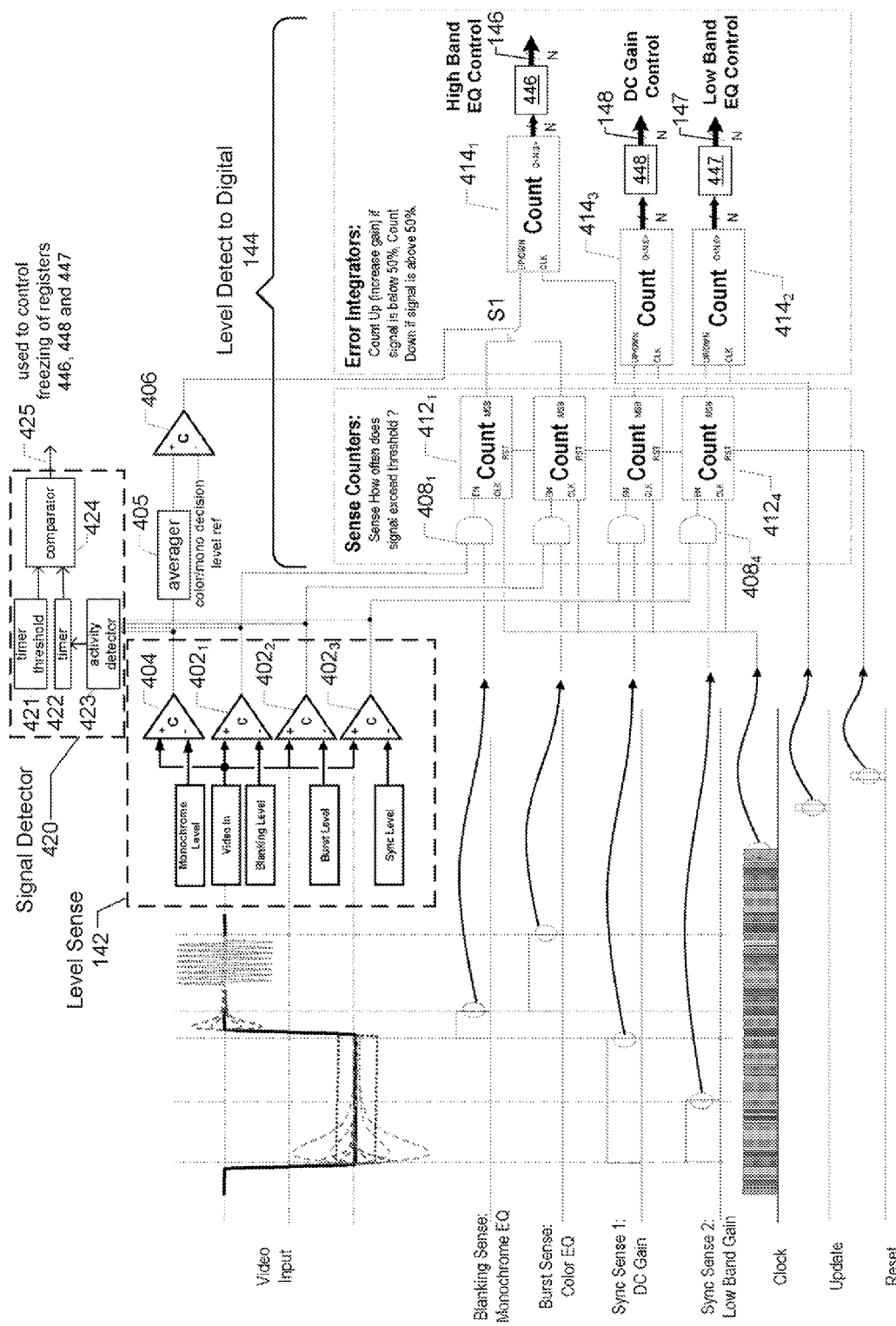
FIG. 4 is a block diagram that shows details of the level sense circuit and the level detect to digital circuit of FIGS. 1A and 1B, according to an embodiment of the present invention.

As shown in FIG. 4, in an embodiment, the outputs of error integrator counters $414_1$, $414_2$ and $414_3$ are stored in registers 446, 447 and 448, respectively, with the values stored in the registers being the control signals 146, 147 and 148 for the various control loops. So long as the registers 446, 447 and 448 are not frozen, the contents of the registers 446, 447 and 448 can be periodically updated, e.g., updated each clock cycle that updates the error integrator counters $414_1$, $414_2$ and $414_3$, or at some slower convenient rate such as video line rate. As will be explained below, the values within the registers 446, 447 and 448 can be selectively frozen (also referred to as locked), to thereby selectively lock the various control loops.

In a noisy environment, after the equalizer 100 has selected the appropriate equalization for the length of cable, noise can cause the output of the error integrator counters $414_1$, $414_2$ and $414_3$ to continuously change, even though the cable is not changing in length. This can result in undesirable flicker in the display of the compensated video signal 116. In accordance with an embodiment of the present invention, to avoid such flicker, the values of the high band equalizer control signal 146, the DC gain control signal 148 and the low band equalizer control signal 147 can be selectively locked (also referred to as frozen). In other words, the control loops used to adjust high band frequencies, DC gain, and low band frequencies can all be selectively locked. In an embodiment, the control loops can be locked by freezing or disabling the error integrator counters $414_1$, $414_2$ and $414_3$, which has the effect of freezing the outputs of the error integrator counters $414_1$, $414_2$ and $414_3$. However, it may be desirable to not freeze or disable the counters $414_1$, $414_2$ and $414_3$. Additionally, or alternatively, the control loops can be locked by freezing the values within the registers 446, 447 and 448 (which can also be referred to as freezing or locking the registers).

In an embodiment, the values of the high band equalizer control signal 146, the DC gain control signal 148 and the low band equalizer control signal 147 are frozen (e.g., by freezing the registers 446, 447 and 448 and/or the error integrator counters $414_1$, $414_2$ and $414_3$) in response to a lock condition being detected. In one embodiment, a lock condition is detected when there is a determination that the output of one or more of the sense counters (e.g., $412_1$) just prior to being reset (or at some other time) deviates by less than a specified amount. In still another embodiment, the lock condition can be an external lock, e.g., caused by applying a predetermined voltage or sequence to an input (e.g., a freeze pin) of the equalizer 100, or by changing a bit or sequence of bits in an internal control register. Other lock conditions are possible, and within the scope of the present invention. The equalizer 100 can be configured to detect only one type of lock condition, or multiple different types of lock conditions. In an embodiment, when a lock condition occurs, a lock flag is set.

Once the values of the signals 146, 148 and 147 are frozen as a result of a lock condition being detected, these values will remain frozen until a reset condition is detected. In one embodiment, the reset condition can be the loss of the video signal 101, i.e., the video signal 101 is no longer being detected. In another embodiment, the reset condition can be the loss of the video signal 101 followed by the detection of the video signal 101. In still another embodiment, the reset condition can be an external reset, e.g., caused by applying a predetermined voltage or sequence to an input (e.g., a reset or freeze pin) of the equalizer 100, or the changing of a bit or sequence in an internal control register. An alternative or additional reset condition can be when the equalizer 100 is powered up (after being powered down). Another possible reset condition can be a reset not having occurred for a predetermined amount of time (e.g., 12 hours). In other words, the system can be designed such that if a reset has not occurred in the past predetermined amount of time (e.g., the past 12 hours), then a reset automatically occurs. Alternatively, the system can simply be reset every predetermined amount of time (e.g., every 12 hours, or every 24 hours), or at predetermined times of the day (e.g., at 12:00 PM and 12:00 AM). Other reset conditions are possible, and within the scope of the present invention. The equalizer 100 can be configured to detect only one type of reset condition, or multiple different types of reset conditions. In an embodiment, when a reset condition occurs, the lock flag is reset.

A signal detector 420 can be used to detect when the video signal 101 is present, i.e., being provided to the equalizer 100. As shown in FIG. 4, the signal detector 420 can include an activity detector 423, a timer 422, a timer threshold register 421 and a comparator 424. The signal detector 420 can monitor for activity at the output(s) of one or more of the comparators $402_1$, $402_2$, $402_3$ and 404. For example, in one embodiment, the signal detector 420 only monitors for activity at the outputs of the comparators $402_2$ and $402_3$. In another embodiment, a separate comparator, included specifically for signal detection, may be monitored. Such a comparator may observe signal activity at the device input, output or any convenient point in the signal chain.

When the video signal 101 is present, the monitored output(s) of the comparator(s) will change state (i.e., toggle) periodically due to the varying amplitude of video signal exceeding then falling below the levels to which the video signal is being compared. However, when the video signal 101 is not present, the monitored output(s) of the comparator(s) will not change state (i.e., will remain idle). The activity detector 423 can reset the timer 422 whenever the activity detector 423 detects a change in the state of the monitored output(s) of the comparator(s). A digital comparator 424, or software and/or firmware, can compare the value of the timer 422 to the timer threshold value that is stored in the register 421. When the value of the timer 422 does not exceed the timer threshold value stored in the register 421, the signal 425 will indicate that the video signal 101 is detected. When the value of the timer 422 exceeds the timer threshold value stored in the register 421, the signal 425 will indicate that the video signal 101 is not detected. Stated another way, if the timer 422 times out, there is a determination that the video signal 101 is not detected. The signal 425, which is indicative of whether or not the video signal 101 is detected, can be a simple binary signal, but need not be.

In alternative embodiments, the activity detector 420 can monitor alternative signal(s)/output(s) within one or more of the control loops to determine whether or not the video signal 101 is detected. Alternative techniques for detecting whether or not the video signal 101 is detected are also possible, and within the scope of the present invention.

When the control loops are locked, the control loops are in effect opened. Conversely, when the control loops are reset or otherwise unlocked, the control loops are in effect closed. In an embodiment, where the control loops are locked by freezing the registers 446, 447 and 448, the error integrator counters $414_1$, $414_2$ and $414_3$ can remain enabled and unfrozen so that when the registers 446, 447 and 448 are unfrozen (i.e., in response to a reset condition being detected), they are immediately updated with the new values within the error integrator counters $414_1$, $414_2$ and $414_3$. In another embodiment, where the control loops are locked by freezing the registers 446, 447 and 448, the error integrator counters $414_1$, $414_2$ and $414_3$ can remain enabled and unfrozen, but the error integrator counters $414_1$, $414_2$ and $414_3$ can be preloaded with the values of the registers 446, 447 and 448 whenever the control loops are reset. In a further embodiment, when the control loops are locked the registers 446, 447 and 448 and the error integrator counters $414_1$, $414_2$ and $414_3$ are all frozen, and then unfrozen when the control loops are reset.

The above described equalizer 100 can be used in a video surveillance system that is used, e.g., for security and/or other safety purposes. Accordingly, it would be desirably to be able to detect potential tampering and/or degradation of the cable and/or video signal. The monitor 150 (in FIG. 1) can be used for this purpose, as will now be explained.

The digital values stored in the registers 446, 447 and 448 can be considered, respectively, a value indicative of the level of high band equalization, a value indicative of the level of low band equalization and a value indicative of the level of DC gain. In accordance with an embodiment, one or more of these values can be stored (e.g., logged) from time to time (e.g., periodically, aperiodically, and/or in response to a triggering event) so that changes in the level of high band equalization, the level of low band equalization and/or the level of DC gain can be monitored. For example, these values can be stored in memory (e.g., as a table, but not limited thereto) or in further registers, and the monitor 150 (in FIG. 1) can monitor such stored values to monitor for changes indicative of potential tampering of the cable and/or video signal, as well as to monitor for changes indicative of degradation of the cable and/or video signal.

In embodiments where the values stored in the registers 446, 447 and 448 are not locked, these values can simply be stored periodically (e.g., at one or more particular times of the day) or in response to specific triggering events. In embodiments where the control loops are locked by freezing the registers (and thus, freezing the values stored in the registers 446, 447 and 448) in response to a lock condition being detected, the values (stored in the registers 446, 447 and 448) can be stored in memory or further registers whenever the registers 446, 447 and 448 are locked, or in response to a lock condition being detected. However, because such stored values are being used to monitor for potential tampering and/or degradation of the cable and/or video signal, the registers 446, 447 and 448 should be reset or unlocked on a regular basis so that monitoring for tampering and/or degradation can occur. For example, as explained above, the system can be designed such that the registers 446, 447 and 448 are reset or unlocked at least every predetermined amount of time (e.g., at least every 12 hours), or at predetermined times of the day. Additionally, the registers 446, 447 and 448 can be reset or unlocked in response to the loss of the video signal 101, or in response to the loss of the video signal 101 followed by the detection of the video signal 101.

Referring to FIG. 7, an exemplary table 700 includes, for each of a plurality of times, a value indicative of the level of high band equalization, a value indicative of the level of low band equalization, and a value indicative of the level of DC gain. In this specific example, such values are stored twice a day, i.e., at 12:00 AM and 12:00 PM. Changes in one or more of these values beyond a corresponding threshold can be interpreted as being indicative of potential tampering and/or degradation of a cable and/or video signal, and can be used to trigger an alert. Relatively slow changes in one or more of these values can be due, e.g., to cable aging, temperature and weather effects, and/or video camera aging. By contrast, rapid changes in one or more of these values would likely be due to an intentional intrusion (e.g., where an intruder tapped into a cable and/or added an additional length of cable), a failure in a cable path, or a failure in (or change of) a video camera.

In accordance with an embodiment, the monitor 150 can be configured to trigger an alert in response to detecting, based on the stored values, a change in at least one type of value that exceeds a corresponding threshold. Different thresholds can be used for different types of values. For example, there can be a high band equalization threshold, a low band equalization threshold, and a DC gain threshold. Each threshold can be a programmed value (e.g., 30) or a programmed percentage (e.g., 20%) that indicates an extent of change that triggers an alert. It is also possible that there is more then one threshold for each type of value, e.g., there can be two different high band equalization thresholds. A change in the high band equalization exceeding a first threshold can be indicative of cable or signal degradation, whereas a change exceeding a second higher threshold can be indicative of an intentional intrusion, a failure in a cable path, or a failure in (or change of) a video camera.

An alert can be triggered in response to a threshold being exceeded. Alternatively, an alert can be triggered in response to detecting a change a type of value (e.g., high band equalization) that exceeds a corresponding threshold within a predetermined amount of time (e.g., 12 hours). For a specific example, the monitor can trigger an alert if the value indicative of high band equalization changes by at least a value of 30 (or at least 20%) from one 12 hour time period to the next. This is just an example, which is not meant to be limiting. In a specific embodiment, an alert is triggered in response to detecting a rate of change in a type of value that exceeds a corresponding threshold.

Where there is only one type of value that is stored (e.g., high band equalization values), an alert can be triggered whenever a change in that type of value exceeds a corresponding threshold. If there are multiple types of values stored (e.g., high band equalization, low band equalization and DC gain), then an alert can be triggered if a change in at least one type of value exceeds its corresponding threshold. Alternatively, where there are multiple types of values that are stored (e.g., N types of values), and changes in each of the multiple types of values are each compared to a separate corresponding threshold, it can be that an alert is only triggered if all of the corresponding thresholds are exceeded. In still another embodiment, where there are multiple types of values that are stored (e.g., N types of values), and changes in each of the multiple types of values are each compared to a separate corresponding threshold, it can be that an alert is triggered if at least M out of N of the thresholds are exceeded. Other variations are also possible.

An alert can be an audible alert and/or a visual alert. Additionally, or alternatively, an alert can be logged in a log that is saved. Further, an alert can cause an email, text message and/or phone call to be sent/made to one or more individuals and/or departments that is/are responsible for the security and/or maintenance of a surveillance system.

An alert can be as simple as informing a system and/or person of a potential problem, without giving details of what may have triggered the alert. Alternatively, an alert can include details about what triggered the alert (e.g., a change in the high band equalization exceeded a corresponding threshold). Additionally, or alternatively, an alert can include information about a possible cause of the alert. For example, one type of alert may specify that cable and/or signal degradation likely due to aging has been detected, whereas another type of alert may specify that a cable was likely cut or otherwise disconnected. These are just a few examples, which are not meant to be limiting.

Figure 5A:
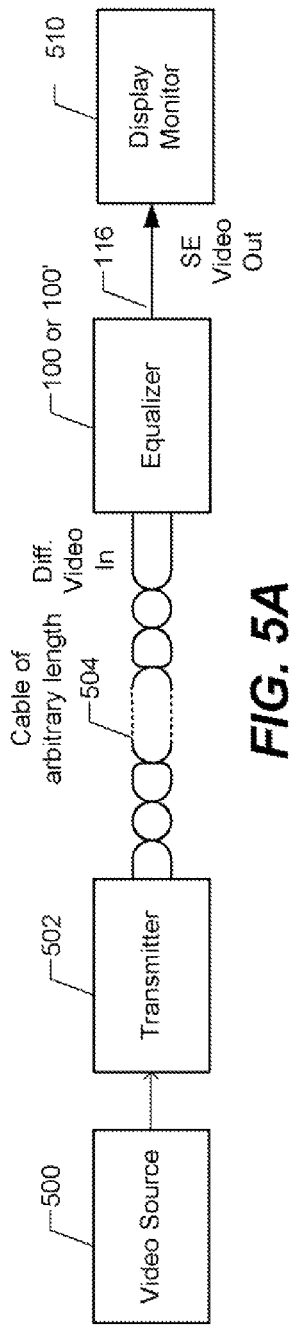
FIGS. 5A & 5B are high level block diagrams of systems that include the equalizer of FIG. 1A or 1B.
Figure 5B:
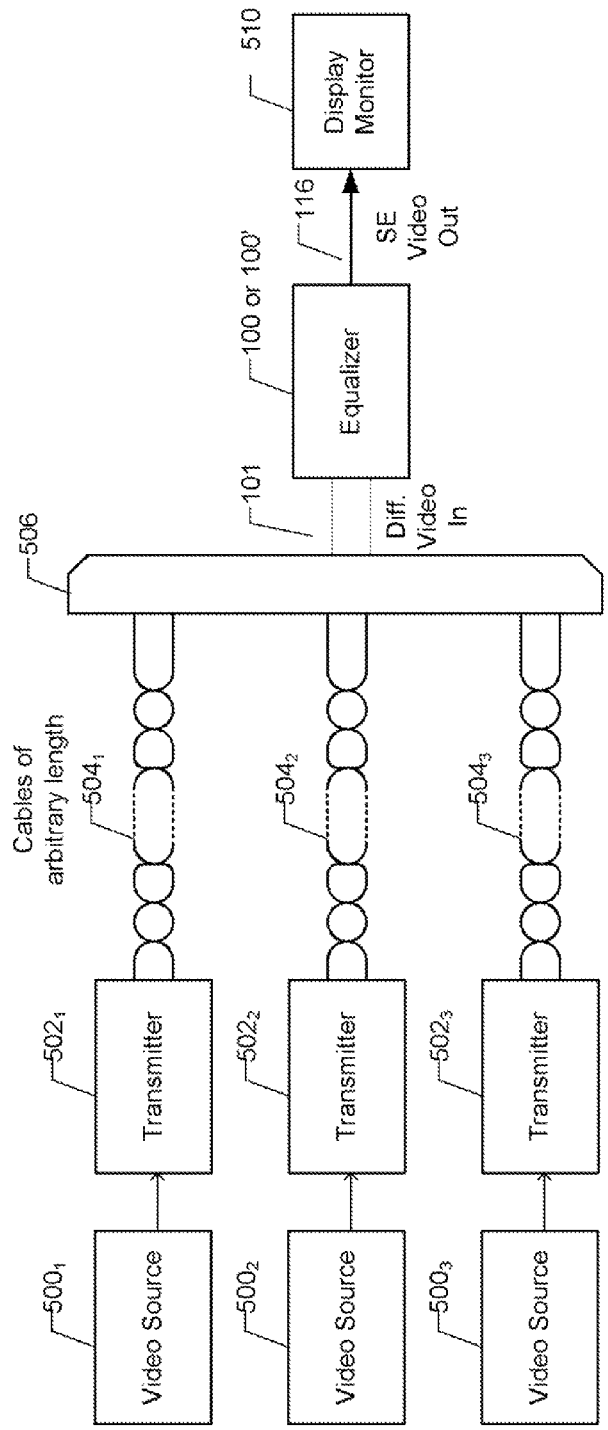

FIGS. 5A & 5B are high level block diagrams of systems that include the equalizer 100 or 100' of FIG. 1A or 1B. Referring to FIG. 5A, a cable link 504 (e.g., an unshielded twisted pair such a CAT5 cable) is connected between the transmitter 502 and an equalizer 100 or 100' of an embodiment of the present invention. The signal that is transmitted over the cable link 504 can be, e.g., a NTSC video signal, or some other type of video signal. The equalizer 100 or 100' compensates for the high and low frequency attenuation caused by the cable link 504 and outputs a compensated video signal 116, which is provided to a display monitor 510.

Referring to FIG. 5B, a mux 506 can be used to select among different video sources 500 (e.g., different surveillance cameras), each associated with a transmitter 502, where each transmitter 502 is connected to the mux 506 by a cable link 504, each of which can have a different length. When the mux 506 selects a different video source 500, the automatic compensation controller 118 of the equalizer 100 automatically adjusts its compensation for frequency attenuation that occurs during the transmission over one of the cable links 504. In the case of the equalizer 100', manual adjustment of the compensation can be performed when the mux 506 is used to select a different video source 500.

Figure 6:
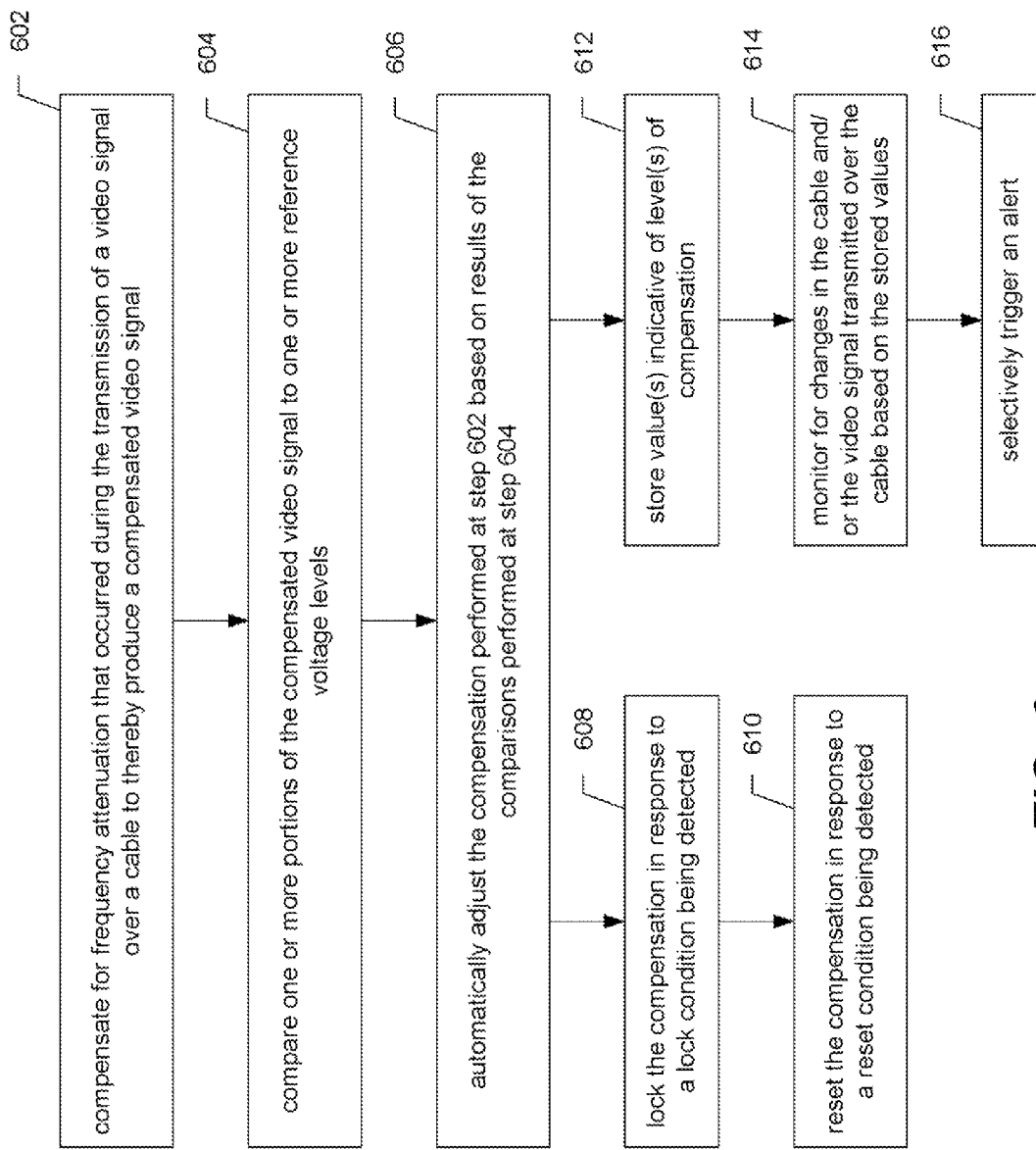
FIG. 6 is a high level flow diagram that is used to summarize various methods of embodiments of the present invention.

The high level flow diagram of FIG. 6 will now be used to summarize various embodiments of the present invention for providing automatic compensation for frequency attenuation of a video signal transmitted over a cable. Referring to FIG. 6, at step 602, frequency attenuation that occurred during the transmission of the video signal over the cable is compensated for to thereby produce a compensated video signal. At step 604, one or more portions of the compensated video signal is/are compared to one or more reference voltage levels. At step 606, there is automatic adjusting of the compensating performed at step 602 based on results of the comparing performed at step 604. At step 608, the compensation provided by the equalizer is locked in response to a lock condition being detected. At step 610, the compensation provided by the equalizer is reset in response to a reset condition being detected. Exemplary lock conditions and reset conditions are discussed above. At step 612, one or more values indicative of one or more levels of compensation being performed at the time is/are stored. At step 614, changes in the cable and/or the video signal transmitted over the cable are monitored for based on the stored value(s). At step 616, an alert is selectively triggered based on results of the monitoring performed at step 614.

In accordance with specific embodiments, step 602 can include compensating for high frequency attenuation caused by the cable and compensating for low frequency attenuation caused by the cable. Step 602 can also include fine tuning DC gain so that an average level of sync tips, of horizontal sync pulses within the compensated video signal, is substantially equal to a predetermined nominal level.

Each line of the compensated video signal produced at step 602 includes a horizontal sync portion, followed by a breezeway portion, followed a color burst portion (if the video signal is color), followed by an active video portion. Step 604 can include comparing the horizontal sync portion of the compensated video signal to a sync level reference voltage, comparing the breezeway portion of the compensated video signal to a blanking level reference voltage, and comparing the color burst portion of the compensated video signal to the burst level reference voltage (if the video signal is a color signal). Step 606 can include automatically adjusting the compensating performed at step 602 based on results of the just mentioned comparisons. Step 608 can include, e.g., freezing various counters and/or registers. Step 610 can include, e.g., unfreezing various counters and/or registers. Step 612 can include storing value(s) indicative of high band equalization, low band equalization and/or DC gain. Step 614 can include comparing changes in the value(s) stored at step 612 to one or more corresponding thresholds. Step 616 can include selectively triggering an audible and/or visual alert and/or transmitting alert type of messages.

Additional details of steps 602-616 are provided in the detailed description of the previously discussed FIGS. For example, specific embodiments for providing compensation for high frequency attenuation that occurred during the transmission of a video signal over a cable are described with reference to FIGS. 2A and 2B. This can include providing a plurality N of equalizer stages connected in series, wherein each of the N equalizer stages includes a differential input and a differential output, and wherein each of the N equalizer stages is optimized for a different portion of the cable (where N is equal to or greater than 3). Additionally, there is a selection of which equalizer stages are active and which equalizer stages are inactive, and a weighted average of the signal input to and output from the last active equalizer stage is produced. The steps in FIG. 6 can be repeated from time to time, with some steps being repeated more frequently than others, or at different times or intervals than others. In a specific embodiment, steps 602, 604 and 608 are performed and repeated until a lock condition is detected and the compensation is locked at step 610. At that point, steps 612 and 614 may be performed. The triggering of an alert at step 616 may only occur in very specific circumstances, some of which were described above. Thereafter, steps 602, 604, 608, 612 and 614 may not occur again until a reset condition is detected at step 610.

In accordance with specific embodiments, providing the plurality N of equalizer stages connected in series includes optimizing a $1^{st}$ one of the equalizer stages for a $1^{st}$ length of the cable (e.g., a first 1000 feet of the cable), optimizing a $2^{nd}$ one of the equalizer stages for a $2^{nd}$ length of the cable (e.g., a second 1000 feet of the cable), . . . and optimizing an $N^{th}$ one of the equalizer stages for an $N^{th}$ length of the cable (e.g., an Nth 1000 feet of the cable).

In accordance with specific embodiments, providing the plurality N of equalizer stages connected in series includes implementing a transfer function for a $1^{st}$ one of the equalizer stages as substantially equal to an inverse of a transfer function of a $1^{st}$ length of the cable (e.g., a first 1000 feet of the cable), implementing a transfer function for a $2^{nd}$ one of the equalizer stages as substantially equal to an inverse of a transfer function of a $2^{nd}$ length of the cable (e.g., a second 1000 feet of the cable), . . . and implementing a transfer function for a $N^{th}$ one of the equalizer stages as substantially equal to an inverse of a transfer function of a $N^{th}$ length of the cable (e.g., a Nth 1000 feet of the cable).

Embodiments of the present invention have been described above with the aid of functional building blocks illustrating the performance of specified functions and relationships thereof. The boundaries of these functional building blocks have often been arbitrarily defined herein for the convenience of the description. Unless otherwise specified, alternate boundaries can be defined so long as the specified functions and relationships thereof are appropriately performed. Any such alternate boundaries are thus within the scope and spirit of the claimed invention. While portions of the invention can be implemented using hardware, other portions of the invention can be implemented using software and/or firmware. Such software and/or firmware can be implemented as a non-transitory computer readable medium, including instructions stored thereon which when read and executed by one or more processors, cause the one or more processors, e.g., one or more digital signal processors (DSPs), but not limited thereto, to perform and/or control specific steps described above. Such processor(s) can also be used to implement certain blocks discussed above, or portions thereof, such as, but not limited to, the monitor 150.

The forgoing description is of the preferred embodiments of the present invention. These embodiments have been provided for the purposes of illustration and description, but are not intended to be exhaustive or to limit the invention to the precise forms disclosed. Many modifications and variations will be apparent to a practitioner skilled in the art. Embodiments were chosen and described in order to best describe the principles of the invention and its practical application, thereby enabling others skilled in the art to understand the invention. Slight modifications and variations are believed to be within the spirit and scope of the present invention. It is intended that the scope of the invention be defined by the following claims and their equivalents.

What is claimed:

1. A method for use with a system that provides automatic compensation for frequency attenuation of a video signal transmitted over a cable, comprising:

(a) compensating for frequency attenuation that occurred during the transmission of the video signal over the cable to thereby produce a compensated video signal;

(b) automatically adjusting the compensating based on analysis of the compensated video signal to thereby automatically adjust for changes in the cable and/or the video signal transmitted over the cable;

(c) for each of a plurality of times, storing one or more values indicative of one or more levels of compensation performed at the time;

(d) monitoring for changes in the cable and/or the video signal transmitted over the cable based on the stored values; and (e) triggering an alert in response to detecting, based on the stored values indicative of one or more levels of compensation performed at the time, at least one of the following
 (i) a change in at least one type of the stored values that exceeds a corresponding threshold,
 (ii) a change in at least one type of the stored values that exceeds a corresponding threshold within a predetermined amount of time, or
 (iii) a rate of change in at least one type of the stored values that exceeds a corresponding threshold.

2. The method of claim 1, wherein step (c) includes one or more of the following, for each of the plurality of times:
 storing a value indicative of the level of high band equalization;
 storing a value indicative of the level of low band equalization; and
 storing a value indicative of the level of DC gain.

3. The method of claim 1, wherein step (d) comprises monitoring for changes indicative of potential tampering of the cable and/or video signal.

4. The method of claim 1, wherein step (d) comprises monitoring for changes indicative of degradation of the cable and/or video signal.

5. The method of claim 1, wherein step (e) comprises triggering an alert in response to detecting, based on the stored values indicative of one or more levels of compensation performed at the time, a change in at least one type of the stored values that exceeds a corresponding threshold.

6. The method of claim 1, wherein step (e) comprises triggering an alert in response to detecting, based on the stored values indicative of one or more levels of compensation performed at the time, a change in at least one type of the stored values that exceeds a corresponding threshold within a predetermined amount of time.

7. The method of claim 1, wherein step (e) comprises triggering an alert in response to detecting, based on the stored values indicative of one or more levels of compensation performed at the time, a rate of change in at least one type of the stored values that exceeds a corresponding threshold.

8. The method of claim 1, wherein:
 step (a) includes at least one of
  (a.1) providing high band equalization to compensate for high frequency attenuation caused by the cable;
  (a.2) providing low band equalization to compensate for low frequency attenuation caused by the cable; and
  (a.3) providing DC gain;
 step (b) includes in least one of
  (b.1) automatically adjusting a level of the high band equalization;
  (b.2) automatically adjusting a level of the low band equalization; and
  (b.3) automatically adjusting a level of the DC gain;
 step (c) includes, for each of the plurality of times, at least one
  (c.1) storing a value indicative of the level of high band equalization;
  (c.2) storing a value indicative of the level of low band equalization; and
  (c.3) storing a value indicative of the level of DC gain; and
 step (d) includes at least one of
  (d.1) monitoring for changes in the value indicative of the level of high band equalization;
  (d.2) monitoring for changes in the value indicative of the level of low band equalization; and
  (d.3) monitoring for changes in the value indicative of the level of DC gain.

9. The method of claim 1, wherein:
 step (a) includes
  (a.1) providing high band equalization to compensate for high frequency attenuation caused by the cable;
  (a.2) providing low band equalization to compensate for low frequency attenuation caused by the cable; and
  (a.3) providing DC gain;
 step (b) includes
  (b.1) automatically adjusting a level of the high band equalization;
  (b.2) automatically adjusting a level of the low band equalization; and
  (b.3) automatically adjusting a level of the DC gain;
 step (c) includes, for each of the plurality of times
  (c.1) storing a value indicative of the level of high band equalization;
  (c.2) storing a value indicative of the level of low band equalization; and
  (c.3) storing a value indicative of the level of DC gain; and
 step (d) includes
  (d.1) monitoring for changes in the value indicative of the level of high band equalization;
  (d.2) monitoring for changes in the value indicative of the level of low band equalization; and
  (d.3) monitoring for changes in the value indicative of the level of DC gain.

10. The method of claim 1, wherein:
 each line of the compensated video signal produced at step (a) includes a horizontal sync portion, followed by a breezeway portion, followed a color burst portion if the video signal is color, followed by an active video portion;
 step (b) comprises automatically adjusting the compensating based on comparisons of one or more portions of the compensated video signal to one or more of a sync level reference voltage, a blanking level reference voltage and a burst level reference voltage.

11. The method of claim 1, further comprising:
 locking the compensating in response to a lock condition being detected; and
 resetting the compensating in response to detecting a reset condition that occurs at least once for each of the plurality of times that one or more values indicative of one or more levels of compensation is/are stored at step (c).

12. A system that provides automatic compensation for frequency attenuation of a video signal transmitted over a cable, comprising:
 an equalizer that receives a video signal that was transmitted over a cable, provides compensation for frequency attenuation that occurred during the transmission over the cable, and outputs a compensated video signal;
 a compensation controller that automatically adjusts the compensation provided by the equalizer based on comparisons of one or more portions of the compensated video signal to one or more reference voltage levels;
 memory and/or registers that store, for each of a plurality of times, one or more values indicative of one or more levels of compensation provided by the equalizer at the time; and
 a monitor that monitors for changes in the cable and/or the video signal transmitted over the cable based on the stored values;

wherein the monitor triggers an alert in response to detecting, based on the stored values indicative of one or more levels of compensation performed at the time, at least one of the following
(i) a change in at least one type of the stored values that exceeds a corresponding threshold,
(ii) a change in at least one type of the stored values that exceeds a corresponding threshold within a predetermined amount of time, or
(iii) a rate of change in at least one type of the stored values that exceeds a corresponding threshold.

13. The system of claim 12, wherein one or more of the following types of values is/are stored in the memory and/or registers, for each of the plurality of times:
a value indicative of the level of high band equalization;
a value indicative of the level of low band equalization; and
a value indicative of the level of DC gain.

14. The system of claim 12, wherein:
the monitor monitors for changes indicative of potential tampering of the cable and/or video signal.

15. The system of claim 12, wherein:
the monitor monitors for changes indicative of degradation of the cable and/or video signal.

16. The system of claim 12, wherein:
the monitor triggers an alert in response to detecting, based on the stored values indicative of one or more levels of compensation performed at the time, a change in at least one type of the stored values that exceeds a corresponding threshold.

17. The system of claim 12, wherein:
the monitor triggers an alert in response to detecting, based on the stored values indicative of one or more levels of compensation performed at the time, a change in at least one type of the stored values that exceeds a corresponding threshold within a predetermined amount of time.

18. The system of claim 12, wherein:
the monitor triggers an alert in response to detecting, based on the stored values indicative of one or more levels of compensation performed at the time, a rate of change in at least one type of the stored values that exceeds a corresponding threshold.

19. The system of claim 12, wherein:
the equalizer includes at least one of
a high band equalizer that compensates for high frequency attenuation caused by the cable;
a low band equalizer that compensates for low frequency attenuation caused by the cable; and
a DC gain controller that fine tunes DC gain of the equalizer so that an average level of sync tips, of horizontal sync pulses within the compensated video signal, is substantially equal to a predetermined nominal level;
the compensation controller automatically adjusts the compensation provided by the equalizer by automatically controlling at least one of the high band equalizer, the low band equalizer and the DC gain controller;
the memory and/or registers store, for each of a plurality of times, at least one of
a value indicative of the level of high band equalization;
a value indicative of the level of low band equalization; and
a value indicative of the level of DC gain; and
the monitor monitors for at least one of
changes in the value indicative of the level of high band equalization;
changes in the value indicative of the level of low band equalization; and
changes in the value indicative of the level of DC gain.

20. The system of claim 12, wherein:
the equalizer includes
a high band equalizer that compensates for high frequency attenuation caused by the cable;
a low band equalizer that compensates for low frequency attenuation caused by the cable; and
a DC gain controller that fine tunes DC gain of the equalizer so that an average level of sync tips, of horizontal sync pulses within the compensated video signal, is substantially equal to a predetermined nominal level;
the compensation controller automatically adjusts the compensation provided by the equalizer by automatically controlling the high band equalizer, the low band equalizer and the DC gain controller;
the memory and/or registers store, for each of a plurality of times,
a value indicative of the level of high band equalization;
a value indicative of the level of low band equalization; and
a value indicative of the level of DC gain; and
the monitor monitors for
changes in the value indicative of the level of high band equalization;
changes in the value indicative of the level of low band equalization; and
changes in the value indicative of the level of DC gain.

21. The system of claim 12, wherein:
the each line of the compensated video signal includes a horizontal sync portion followed by a breezeway portion, followed a color burst portion if the video signal is color, followed by an active video portion; and
the compensation controller performs comparisons of the horizontal sync portion of the compensated video signal to a sync level reference voltage, and controls the low band equalizer and the DC gain control based on results of the comparisons.

22. The system of claim 12, wherein the compensation controller:
locks the compensation provided by the equalizer in response to detecting a lock condition; and
resets the compensation provided by the equalizer in response to detecting a reset condition that occurs at least once for each of the plurality of times that one or more values indicative of one or more levels of compensation is/are stored in the memory and/or registers.

23. A non-transitory computer readable medium, including instructions stored thereon which when read and executed by one or more processors cause the one or more processors to perform the steps comprising:
(a) controlling compensating for frequency attenuation that occurred during transmission of a video signal over a cable to thereby produce a compensated video signal;
(b) controlling automatically adjusting the compensating based on analysis of the compensated video signal to thereby automatically adjust for changes in the cable and/or the video signal transmitted over the cable;
(c) for each of a plurality of times, controlling storing one or more values indicative of one or more levels of compensation performed at the time;
(d) monitoring for changes in the cable and/or the video signal transmitted over the cable based on the stored values; and
(e) triggering an alert in response to detecting, based on the stored values indicative of one or more levels of compensation performed at the time, at least one of the following (i) a change in at least one type of the stored values that exceeds a corresponding threshold,
(ii) a change in at least one type of the stored values that exceeds a corresponding threshold within a predetermined amount of time, or
(iii) a rate of change in at least one type of the stored values that exceeds a corresponding threshold.

\* \* \* \* \*